(12) United States Patent
Ko et al.

(10) Patent No.: US 8,866,040 B2
(45) Date of Patent: Oct. 21, 2014

(54) SPATTER REMOVING DEVICE FOR LASER WELDER

(75) Inventors: Tae-Young Ko, Yongin-si (KR); Jin-Pil Kim, Yongin-si (KR)

(73) Assignee: Samsung SDI Co., Ltd., Giheung-gu, Yongin-si, Gyeonggi-do (KR)

( * ) Notice: Subject to any disclaimer, the term of this patent is extended or adjusted under 35 U.S.C. 154(b) by 428 days.

(21) Appl. No.: 13/397,106

(22) Filed: Feb. 15, 2012

(65) Prior Publication Data

US 2012/0234804 A1   Sep. 20, 2012

(30) Foreign Application Priority Data

Mar. 16, 2011   (KR) .................. 10-2011-0023346

(51) Int. Cl.
| | |
|---|---|
| *B23K 26/14* | (2014.01) |
| *B23K 26/20* | (2014.01) |
| *B23K 26/24* | (2014.01) |
| *B23K 26/12* | (2014.01) |

(52) U.S. Cl.
CPC .......... *B23K 26/1405* (2013.01); *B23K 26/246* (2013.01); *B23K 26/14* (2013.01); *B23K 26/127* (2013.01); *B23K 26/20* (2013.01)
USPC ............................... 219/121.63; 219/121.84

(58) Field of Classification Search
CPC ..... B23K 26/14; B23K 26/1405; B23K 26/20
USPC .............. 219/121.63, 121.64, 121.84, 121.86
See application file for complete search history.

(56) References Cited

U.S. PATENT DOCUMENTS

| | | | | | |
|---|---|---|---|---|---|
| 4,078,165 | A | * | 3/1978 | Tuttle ........................ | 219/121.84 |
| 5,359,176 | A | * | 10/1994 | Balliet et al. ............. | 219/121.84 |
| 6,586,705 | B1 | | 7/2003 | Schell | |
| 2003/0222060 | A1 | | 12/2003 | Gabzdyl | |
| 2005/0121144 | A1 | * | 6/2005 | Edo et al. .................. | 156/345.32 |

FOREIGN PATENT DOCUMENTS

| | | |
|---|---|---|
| JP | 59-068690 U | 5/1984 |
| JP | 09-248692 A | 9/1997 |
| JP | 10-272326 | 10/1998 |
| JP | 11-047524 | 2/1999 |
| JP | 2001-084579 A | 3/2001 |
| KR | 10-2004-0101833 | 12/2004 |
| KR | 10-2009-0030581 | 3/2009 |
| KR | 10-2009-0091906 | 8/2009 |

OTHER PUBLICATIONS

Korean Notice of Allowance issued by KIPO on Sep. 24, 2012 in the corresponding Korean Patent Application No. 10-2011-0023346.

* cited by examiner

*Primary Examiner* — Samuel M Heinrich
(74) *Attorney, Agent, or Firm* — Robert E. Bushnell, Esq.

(57) ABSTRACT

A spatter removing device for a laser welder including an optic head to which a laser beam is transferred through an optic fiber from a laser oscillator, a cross jet mounted at one side of a lower end portion of the optic head, a safety cover provided at the outside of the optic head so as to surround the optic head, and a material injection unit that injects a material to be welded below the optic head, the device includes a discharge unit and a spatter cooling device. The discharge unit is provided with a discharge pipe that discharges a welding gas and the spatter at one side portion of the safety cover. The spatter cooling device is connected to the discharge pipe and cools the spatter so that the spatter is forcibly collected.

13 Claims, 5 Drawing Sheets

SPATTER REMOVING DEVICE FOR LASER WELDER

RELATED APPLICATIONS

This application makes reference to, incorporates the same herein, and claims all benefits accruing under 35 U.S.C. §119 from an application earlier filed in the Korean Intellectual Property Office on Mar. 16, 2011 and there duly assigned Serial No. 10-2011-0023346.

BACKGROUND OF THE INVENTION

1. Field of the Invention

The present invention generally relates to a spatter removing device for a laser welder.

2. Description of the Related Art

In industrial fields, laser beams having excellent results in terms of cost reduction, factory automation and quality improvement have recently been applied to cutting, welding and heat treatment of a metallic material, and the like. Some objects required in application of the laser beams are uniformity of laser beam energy distribution, laser power control capable of maintaining a certain heat treatment temperature, optimal laser beam irradiation speed capable of satisfying productivity and quality, maximization of energy absorptivity, and the like.

The above information disclosed in this Related Art section is only for enhancement of understanding of the background of the invention and therefore it may contain information that does not form the prior art that is already known to a person of ordinary skill in the art.

SUMMARY OF THE INVENTION

Exemplary embodiments of the present invention provide for a spatter removing device for a laser welding, in which spatter generated in welding of a material to be welded using a welder is cooled, collected and removed, so that it is possible to prevent the occurrence of a failure of the material to be welded and to maintain the interior of a welding chamber to be always clean.

According to an aspect of the present invention, there may be provided a spatter removing device for a laser welder comprising an optic head to which a laser beam is transferred through an optic fiber from a laser oscillator, a cross jet mounted at one side of a lower end portion of the optic head, a safety cover provided at the outside of the optic head so as to surround the optic head, and a material injection unit that injects a material to be welded below the optic head, the device comprising: a discharge unit provided with a discharge pipe that discharges a welding gas and the spatter at one side portion of the safety cover; and a spatter cooling device connected to the discharge pipe, the spatter cooling device cooling the spatter so that the spatter is forcibly collected.

The spatter cooling device may have a ring shape and polygonal ring shape. The spatter cooling device may be integrally connected to the discharge pipe or may be coaxially connected to the discharge pipe.

The spatter cooling device may be provided with a gas injection hole formed in an outer circumferential surface thereof, a nozzle formed in an inner circumferential surface thereof to spray a cooling gas injected from the gas injection hole, and an internal channel that connects the cooling gas injection hole and the nozzle.

The spatter removing device may further include a cooling gas supplying device connected to the cooling gas injection hole. The cooling gas supplying device may supply an inert gas.

The cooling gas may be sprayed in a front direction by the nozzle. The cooling gas may be sprayed toward the direction in which the spatter is discharged by the nozzle.

The nozzle may have a slit shape or cylindrical shape.

The spatter removing device may further include a collection unit connected to the discharge pipe so as to collector the spatter cooled by the cooling gas and then discharged.

The spatter cooling device may be provided with a plurality of spatter cooling devices.

As described above, according to embodiments of the present invention, spatter generated in welding of a material to be welded using a welder is cooled, collected and removed, so that it is possible to prevent the occurrence of a failure of the material to be welded and to maintain the interior of a welding chamber to be always clean.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF THE INVENTION

Figure 1:
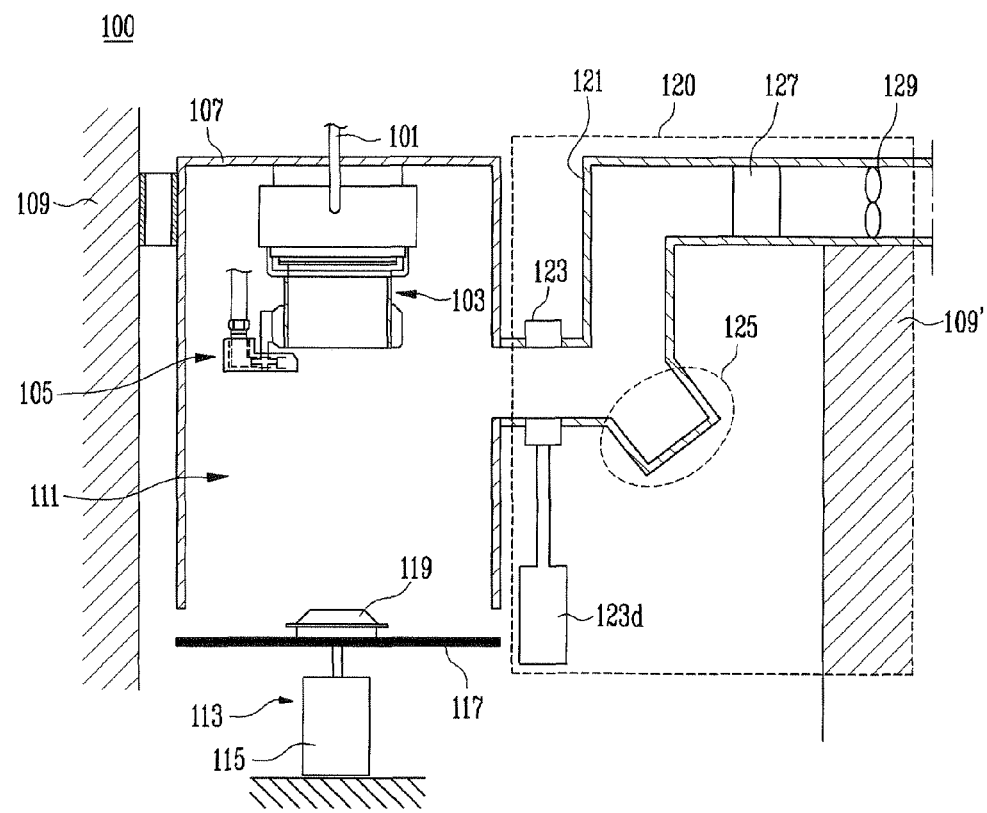
FIG. 1 is an entire configuration view of a spatter removing device for a laser welder according to an embodiment of the present invention.

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. In addition, when an element is referred to as being "on" another element, it can be directly on the another element or be indirectly on the another element with one or more intervening elements interposed therebetween. Also, when an element is referred to as being "connected to" another element, it can be directly connected to another element or be indirectly connected to the another element with one or more intervening elements interposed therebetween. Hereinafter, like reference numerals refer to like elements.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Recognizing that sizes and thicknesses of constituent members shown in the accompanying drawings are arbitrarily given for better understanding and ease of description, the present invention is not limited to the illustrated sizes and thicknesses.

In order to clarify the present invention, elements extrinsic to the description are omitted from the details of this description, and like reference numerals refer to like elements throughout the specification.

In several exemplary embodiments, constituent elements having the same configuration are representatively described in a first exemplary embodiment by using the same reference numeral and only constituent elements other than the constituent elements described in the first exemplary embodiment will be described in other embodiments.

Generally, a laser welder for performing laser beam application treatment including laser welding and the like is provided with an optic head having an optical system including a focus lens for increasing the energy density of laser beams, and the like. The optic head uses an air curtain formed through a cross jet, which blocks spatter scattered onto a lower end portion of the optic head, so as to prevent optical components of the optic head from being damaged by the spatter (scattered sparks and dusts) that is a processing byproduct produced in processing.

In embodiments of the present invention, a laser welder among welders will be described as an example. However, the spatter removing device of the present invention is not limited to the laser welder but may be applied to generally used welders.

Hereinafter, embodiments of the present invention will be described in detail with reference to the accompanying drawings.

Generally, the configuration of a fixed laser welder will be briefly described. The fixed laser welder is provided with an optic head to which a laser beam is transferred through an optic fiber from a laser oscillator, and a cross jet is mounted at one side of a lower end portion of the optic head.

A safety cover subjected to plating treatment using an aluminum material is configured to form a welding chamber at an outside of the optic head. Here, a bottom of the safety cover may be opened, and one side of the safety cover is connected to a fixing portion. The safety cover protects an operator from spatter and laser beam, generated in a laser welding operation.

A material injector may be provided below the optic head. Here, the material injector is configured as a pneumatic cylinder that loads a material to be welded and injects the loaded material into the welding chamber.

Accordingly, if the material to be welded is injected into the welding chamber through the material injector, laser welding may be performed by irradiating a laser beam onto a welding portion of the material to be welded through optic head. In this instance, the cross jet forms an air curtain below the optic head by spraying air at a high speed so that spatter generated and scattered at the welding portion of the material to be welded does not damage an optic component of the optic head. The cross jet also blows the scattered spatter toward the safety cover.

However, although the optical component of the optic head can be protected from the spatter scattered by the cross jet through the configuration of the conventional fixed laser welder described above, the spatter blown toward the safety cover is accumulated in the welding chamber and surrounds, and therefore, becomes a cause of the contamination of the operational environment. Furthermore, the spatter falls again on the welding portion of the material to be welded, and therefore, welding quality is deteriorated, and the like.

Figure 2:
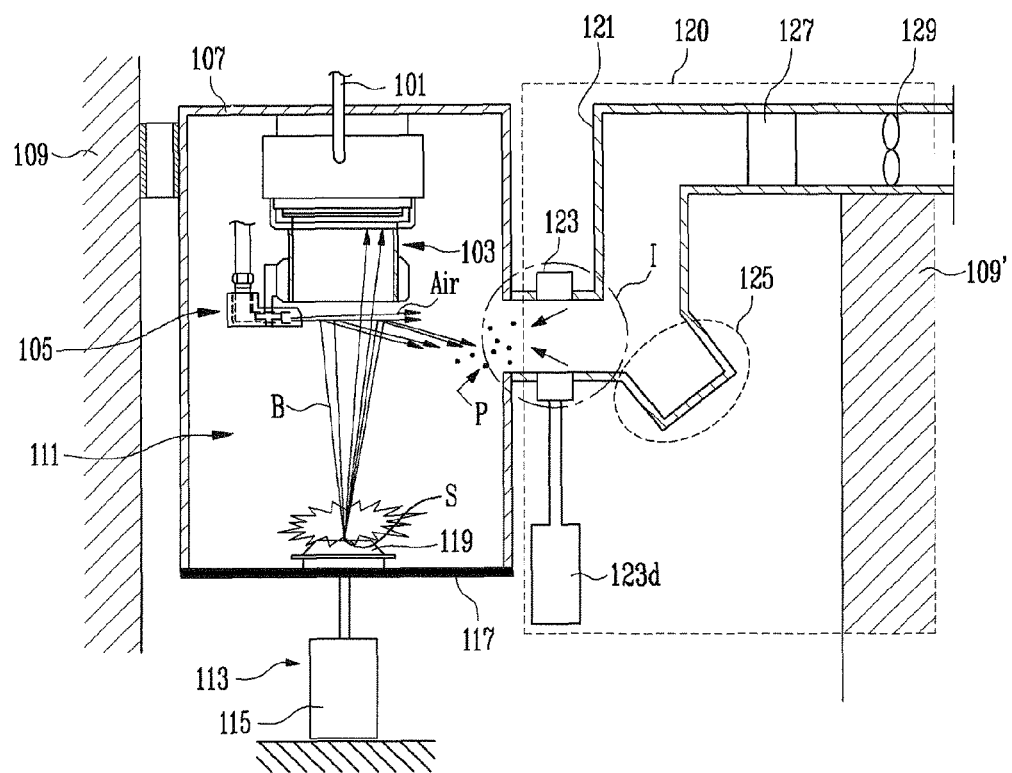
FIG. 2 is a use state view of the spatter removing device according to the embodiment of the present invention.

In order to solve such problems, FIG. 1 is an entire configuration view of a spatter removing device for a laser welder according to an embodiment of the present invention. FIG. 2 is a use state view of the spatter removing device according to the embodiment of the present invention.

The spatter removing device 100 for the laser welder according to this embodiment may be provided with an optic head 103 that irradiates a laser beam B transferred through an optic fiber 101 from a laser oscillator (not shown) onto a material S to be welded, and a cross jet 105 is mounted at one side of a lower end portion of the optic head 103.

A safety cover 107 that surrounds the optic head 103 may be mounted at an outside of the optic head 103. The safety cover 107 subjected to plating treatment using an aluminum material may be mainly used, and one side of the safety cover 107 may be fixed to a fixing portion.

The safety cover 107 may be configured in the state that its bottom is opened, and the inside of the safety cover 107 forms a welding chamber 111 so as to protect an operator from spatter P and laser beam B, generated in a laser welding operation.

A material injection unit 113 may be disposed below the optic head 103. The material injection unit 113 includes a loading die 119 on which the material S to be welded is loaded, a lifting cylinder 115 that allows the material S to be welded to be injected into the welding chamber 111, and a lower cover 117 mounted on a front end of the loading die 119 connected to the lifting cylinder 115 so as to close the opening at the bottom of the safety cover 107. Here, the loading die 119 may be integrally formed with the lower cover 117 on the lower cover 117.

Meanwhile, a discharge unit 120 provided with a discharge pipe 121 used to discharge a welding gas and the spatter P may be connected to one side portion of the safety cover 107. The other side of the discharge unit 120 may be fixed to a fixing unit 109'.

A spatter cooling device 123 connected to the discharge pipe 121 so as to forcibly collect the spatter P is provided at an entrance portion of the discharge pipe 121. Here, the spatter cooling device 123 may be integrally connected to the discharge pipe 121, and may be coaxially connected to the discharge pipe 121.

Hereinafter, the spatter cooling device according to the embodiment of the present invention will be described in detail with reference to FIGS. 2 to 5B.

Figure 3:
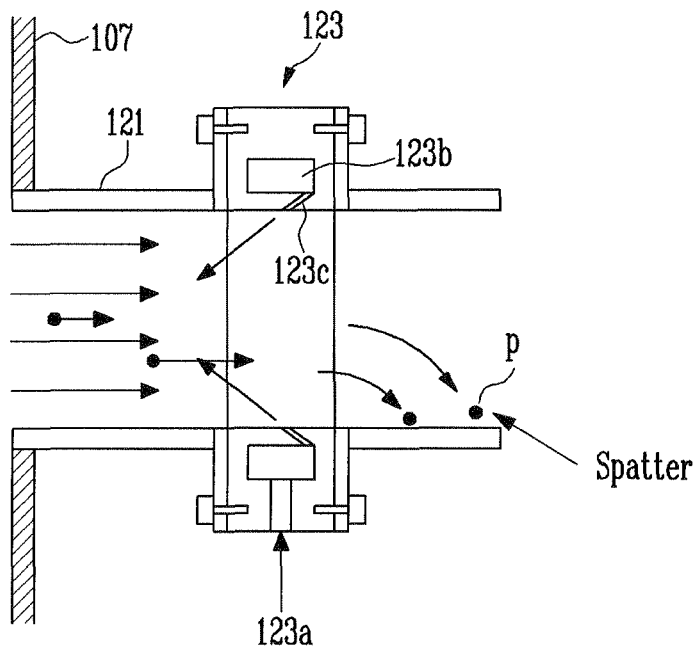
FIG. 3 is an enlarged view of portion I in FIG. 2.
Figure 4:
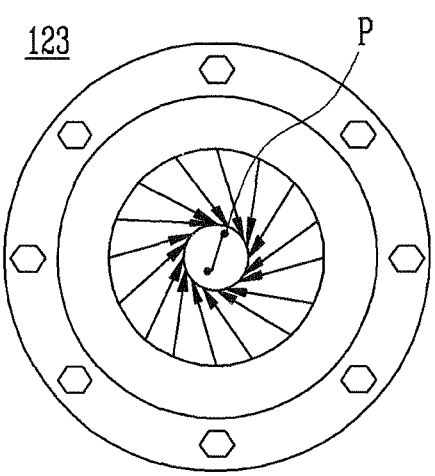
FIG. 4 is a cross-sectional view of FIG. 3 viewed in the length direction of a discharge pipe, for illustrating an operational principle of a spatter cooling device according to the embodiment of the present invention.
Figure 5A:
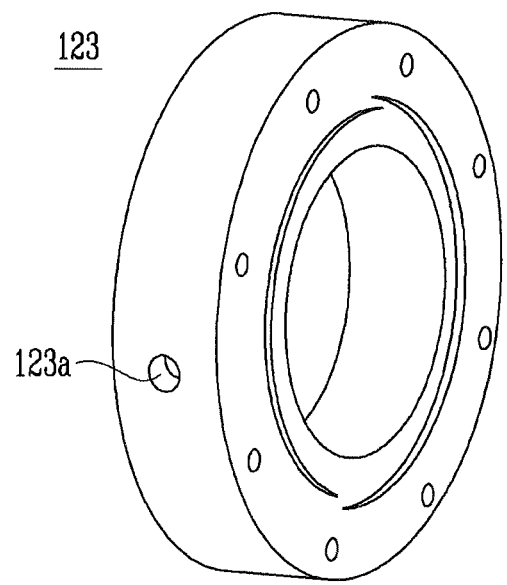
FIG. 5A is a perspective view of the spatter cooling device according to the embodiment of the present invention.
Figure 5B:
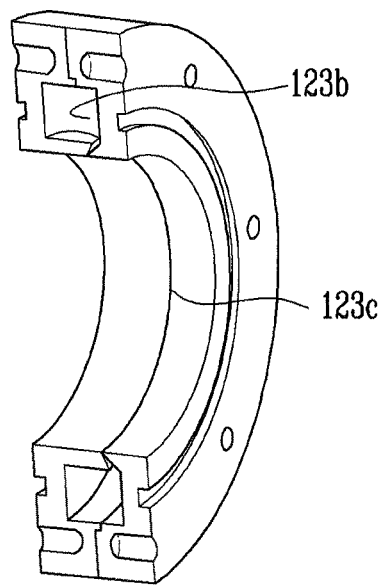
FIG. 5B is a sectional perspective view showing an internal structure of FIG. 5A.

FIG. 2 is a use state view of the spatter removing device according to the embodiment of the present invention. FIG. 3 is an enlarged view of portion I in FIG. 2. FIG. 4 is a cross-sectional view of FIG. 3 viewed in the length direction of a discharge pipe, for illustrating an operational principle of a spatter cooling device according to the embodiment of the present invention. FIG. 5A is a perspective view of the spatter cooling device according to the embodiment of the present invention. FIG. 5B is a sectional perspective view showing an internal structure of FIG. 5A.

Referring to FIG. 5A, the spatter cooling device 123 may be formed to have a ring shape or polygonal ring shape. If the spatter cooling device 123 is formed to have the ring shape or polygonal ring shape according to the shape of the discharge pipe 121, it is easy for the spatter cooling device 123 to be coaxially connected to the discharge pipe 121.

Referring to FIG. 5B, the spatter cooling device 123 is provided with a gas injection hole 123a (see FIG. 5A) formed in an outer circumferential surface thereof, a nozzle 123c formed in an inner circumferential surface thereof to spray a cooling gas injected from the gas injection hole 123a, and an internal channel 123b that connects the cooling gas injection hole 123a and the nozzle 123c. Here, a cooling gas supplying device 123d is connected to the cooling gas injection hole 123a. The cooling gas supplying device 123d may supply an inert gas, and the inert gas may be any one selected from the group of cooling nitrogen, argon, helium and carbon dioxide.

Referring to FIGS. 3 and 4, the cooling gas may be sprayed in a front direction by the nozzle 123c so as to cool the spatter P. However, the cooling gas is preferably sprayed toward the direction in which the spatter P is discharged by the nozzle 123c so that the spatter P can be effectively cooled before it is discharged to the discharge pipe 121.

In the spatter removing device 100 for the laser welder having a configuration described above, the nozzle 123c may have a slit shape or cylindrical shape. The spatter removing device 100 for the laser welder may be further provided with a collection device 125 that collects the spatter P cooled and discharged through the configuration described above. Here, oil may be further provided to the collection device 125 so as to prevent the cooled and collected spatter P from being scattered again.

Meanwhile, although not shown in these figures, the spatter removing device 100 for the laser welder according to this embodiment may be provided with a filter system that forms a pressure gradient so that the spatter P may be discharged in the direction of the discharge pipe 121 from an outside of the lower portion of the safety cover 107. The filter system prevents the generated spatter P from being scattered in the opposite direction of the discharge pipe 121. In addition, the welding gas in the safety cover 107 may be also discharged in the direction of the discharge pipe 127 by the filter system. The discharged welding gas may be discharged to the exterior of the spatter removing device 100 through a discharge fan 129 in the state that fine foreign matters are filtered from the welding gas through a filter 127.

The spatter cooling device 123 may be provided with a plurality of spatter cooling devices depending on user's demands, and a commercial vortex tube may be used as the spatter cooling device 123.

Hereinafter, the cooling principle of the vortex tube will briefly be described.

The vortex tube may be a cooling device that can generate ultra low-temperature air immediately when compressed air is supplied thereto. If the compressed air is supplied to the vortex tube through a pipe, it may be injected into a vortex rotary chamber so as to be rotated at an ultrafast speed. The rotary air (primary vortex) advances toward a warm-air exit. Here, a portion of the air may be discharged to the warm-air exit by a regulation valve, and the rest of the air is returned at the regulation valve so as to be discharged to a cool-air exit while forming a secondary vortex. In this instance, the flow of the secondary vortex loses its calorie while passing through a region having a lower pressure than the flow of the primary vortex, which is located at an inside of the flow of the primary vortex, and advances toward the cool-air exit. In two flows of rotary air, air particles in the internal flow has the same time when it is rotated once as air particles in the external flow, and therefore, the flow speed of the internal flow is actually lower than that of the external flow. The difference between the flow speeds means that kinetic energy is decreased. The lost kinetic energy is converted into heat to increase the temperature of the air in the external flow, and therefore, the temperature of the air in the internal flow is further decreased.

Figure 6:
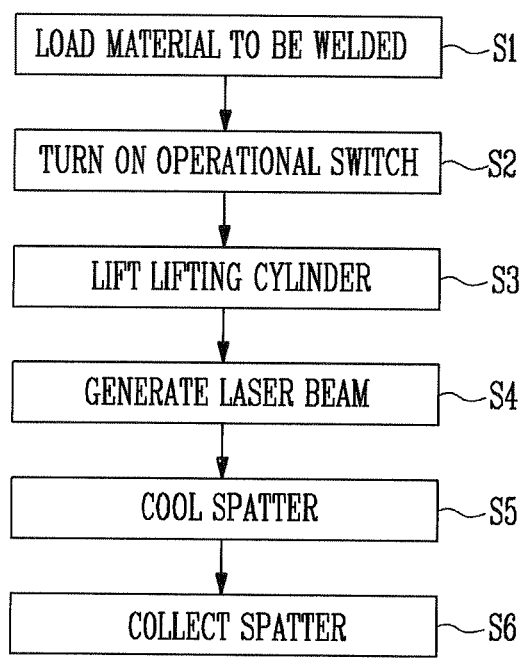
FIG. 6 is a flowchart illustrating an operation of the spatter removing device according to an embodiment of the present invention.

The operation of the spatter removing device 100 for the laser welder configured as described above will be described. As shown in FIGS. 2 and 6, the material S to be welded is loaded on the loading die 119 (S1). In this state, an operator turns on an operational switch (S2), and the lifting cylinder 115 is operated and lifted. Then, the loading die 119 is lifted together with the lower cover 117, so that the material S to be welded may be injected into the welding chamber 111 as shown in FIG. 2 (S3).

In this state, the laser oscillator is oscillated so as to generate the laser beam B of FIG. 2 (S4). Next, the laser beam B transferred through the optic fiber 101 is irradiated onto the welding portion of the material S to be welded through the optic head 103, thereby performing laser welding.

In this instance, the spatter P generated and scattered from the welding portion of the material S to be welded is dropped in the direction of lower cover 117 from the inside of the safety cover 107 by the air curtain formed below the optic head 103, and is cooled by the spatter cooling device 123 at the entrance portion of the discharge pipe 121 while being again discharged in the direction of the discharge pipe 121 by the filter system (S5). Since the spatter P is a high-temperature welding residue, it may cause a fire in the pipe, and the like. Such a problem may be prevented in advance by the spatter cooling device 123 according to this embodiment.

The spatter P cooled through the aforementioned principle is collected by the collection device 125 (S6). As described above, the oil may be further provided to the collection device 125 so as to prevent the cooled and collected spatter P from being scattered again.

As described above, the welding gas in the safety cover 107 is also discharged in the direction of the discharge pipe 121 by the filter system, and may be discharged to the spatter removing device 100 through the discharge fan 129 in the state that fine foreign matters are filtered from the welding gas through the filter 127.

According to the embodiments of the present invention, it is possible to provide a spatter removing device for a welder, in which spatter generated in welding of a material to be welded using the welder is cooled, collected and removed, so that it is possible to prevent a failure of the material to be welded and maintain the interior of a welding chamber to be always clean.

While the present invention has been described in connection with certain exemplary embodiments, it is to be understood that the invention is not limited to the disclosed embodiments, but, on the contrary, is intended to cover various modifications and equivalent arrangements included within the spirit and scope of the appended claims, and equivalents thereof.

What is claimed is:

1. A spatter removing device for a laser welder including an optic head to which a laser beam is transferred through an optic fiber from a laser oscillator, a cross jet mounted at one side of a lower end portion of the optic head, a safety cover provided at the outside of the optic head so as to surround the optic head, and a material injection unit that injects a material to be welded below the optic head, the device, comprising:

a discharge unit provided with a discharge pipe that discharges a welding gas and the spatter at one side portion of the safety cover; and a spatter cooling device connected to the discharge pipe, the spatter cooling device cooling the spatter so that the spatter is forcibly collected.

2. The device according to claim 1, wherein the spatter cooling device is integrally connected to the discharge pipe.

3. The device according to claim 2, wherein the spatter cooling device is coaxially connected to the discharge pipe.

4. The device according to claim 1, wherein the spatter cooling device has a ring shape or polygonal ring shape.

5. The device according to claim 4, wherein the spatter cooling device is provided with a gas injection hole formed in an outer circumferential surface thereof, a nozzle formed in an inner circumferential surface thereof to spray a cooling gas injected from the gas injection hole, and an internal channel that connects the cooling gas injection hole and the nozzle.

6. The device according to claim 5, further comprising a cooling gas supplying device connected to the cooling gas injection hole.

7. The device according to claim 6, wherein the cooling gas supplying device supplies an inert gas.

8. The device according to claim 5, wherein the cooling gas is sprayed in a front direction by the nozzle.

9. The device according to claim 5, wherein the cooling gas is sprayed toward the direction in which the spatter is discharged by the nozzle.

10. The device according to claim 5, wherein the nozzle has a slit shape or cylindrical shape.

11. The device according to claim 5, further comprising a collection unit connected to the discharge pipe so as to collector the spatter cooled by the cooling gas and then discharged.

12. The device according to claim 1, wherein the spatter cooling device is provided with a plurality of spatter cooling devices.

13. A spatter removing device for a laser welder, comprising:

an optic head to which a laser beam is transferred through an optic fiber from a laser oscillator;

a cross-jet mounted at one side of a lower end portion of the optic head;

a safety cover provided surrounding an exterior of the optic head;

a material injection unit that injects a material to be welded below the optic head;

a discharge unit having a collection device and a discharge pipe having a fan that discharges a welding gas and the spatter at one side portion of the safety cover; and a spatter cooling device connected to the discharge pipe, the spatter cooling device cooling the spatter so that the spatter is forcibly collected in the collection device, said collection device is disposed between the spatter cooling device and the discharge pipe.

* * * * *